(12) United States Patent
Munz et al.

(10) Patent No.: US 7,815,360 B2
(45) Date of Patent: Oct. 19, 2010

(54) MATERIAL PROCESSING PLANT WITH TWO EXTRUDING MACHINES

(75) Inventors: Rainer Munz, Murrhardt (DE); Jürgen Strecker, Korntal (DE)

(73) Assignee: Coperion GmbH, Stuttgart (DE)

( * ) Notice: Subject to any disclaimer, the term of this patent is extended or adjusted under 35 U.S.C. 154(b) by 1030 days.

(21) Appl. No.: 10/558,174

(22) PCT Filed: Apr. 17, 2004

(86) PCT No.: PCT/EP2004/004093
§ 371 (c)(1),
(2), (4) Date: Oct. 24, 2006

(87) PCT Pub. No.: WO2004/106031
PCT Pub. Date: Dec. 9, 2004

(65) Prior Publication Data
US 2007/0104814 A1    May 10, 2007

(30) Foreign Application Priority Data
May 28, 2003   (EP) .................................. 03011995

(51) Int. Cl.
*B29B 7/46*     (2006.01)
*B29C 47/50*    (2006.01)
(52) U.S. Cl. .................. 366/91; 366/290; 425/186; 425/190; 425/205

(58) Field of Classification Search .................. 366/79, 366/83–86, 91, 96–99, 318, 290–291; 425/204, 425/205, 208, 192 R, 186, 190
See application file for complete search history.

(56) References Cited

U.S. PATENT DOCUMENTS

| | | | |
|---|---|---|---|
| 3,261,056 A |   | 7/1966 | Fritsch |
| 3,860,220 A | * | 1/1975 | Matsubayashi et al. ........ 366/86 |
| 3,876,545 A | * | 4/1975 | Norwood ..................... 210/236 |
| 4,127,372 A | * | 11/1978 | Perla et al. ................ 425/131.1 |
| 4,615,664 A | * | 10/1986 | Kolossow .................... 425/4 C |
| 4,728,279 A | * | 3/1988 | Bellmer ....................... 425/185 |
| 5,865,472 A | * | 2/1999 | Freynhofer ................... 285/41 |

(Continued)

FOREIGN PATENT DOCUMENTS

DE              2 304 088          8/1973

(Continued)

*Primary Examiner*—Charles E Cooley
(74) *Attorney, Agent, or Firm*—McGlew and Tuttle, P.C.

(57) ABSTRACT

A material processing plant comprises two screw-type extruding machines (1, 2) which are interconnected by means of a link (29). The link (29) is movable from a position of connection into an open position of release of the casing bores (12). Provision is further made for a mover (38) which acts on the link (29) for implementation of the motion.

26 Claims, 8 Drawing Sheets

U.S. PATENT DOCUMENTS

| | | | |
|---|---|---|---|
| 6,273,703 B1 * | 8/2001 | Hirschkorn | 425/188 |
| 7,264,460 B2 * | 9/2007 | Munz et al. | 425/205 |
| 7,438,550 B2 * | 10/2008 | Munz | 425/192 R |
| 7,473,087 B2 * | 1/2009 | Steiner | 425/135 |
| 7,547,132 B2 * | 6/2009 | Davids et al. | 366/91 |
| 2006/0018987 A1 * | 1/2006 | Hasegawa | 425/192 R |
| 2006/0233903 A1 * | 10/2006 | Munz | 425/225 |
| 2006/0240133 A1 * | 10/2006 | Munz et al. | 425/205 |
| 2006/0245294 A1 * | 11/2006 | Burkhardt | 366/85 |
| 2007/0104814 A1 * | 5/2007 | Munz et al. | 425/205 |
| 2008/0124420 A1 * | 5/2008 | Davids et al. | 425/204 |

FOREIGN PATENT DOCUMENTS

| | | |
|---|---|---|
| EP | 1 005 411 B1 | 6/2000 |
| EP | 1 008 434 | 6/2000 |
| GB | 1 183 445 | 3/1970 |
| GB | 1 362 725 | 8/1974 |
| JP | 61266222 A * | 11/1986 |
| JP | 07205147 | 8/1995 |
| JP | 10109349 A * | 4/1998 |

* cited by examiner

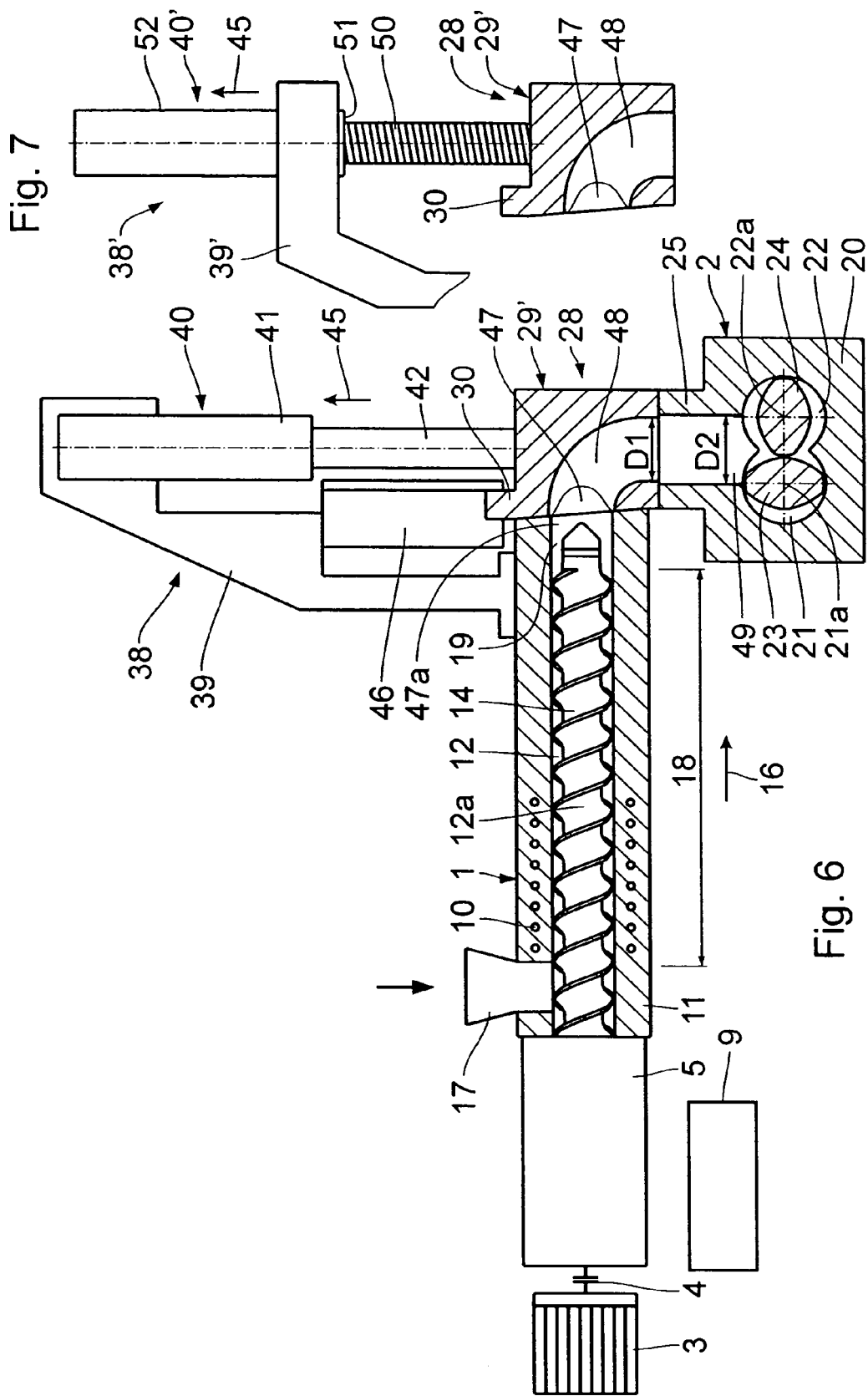

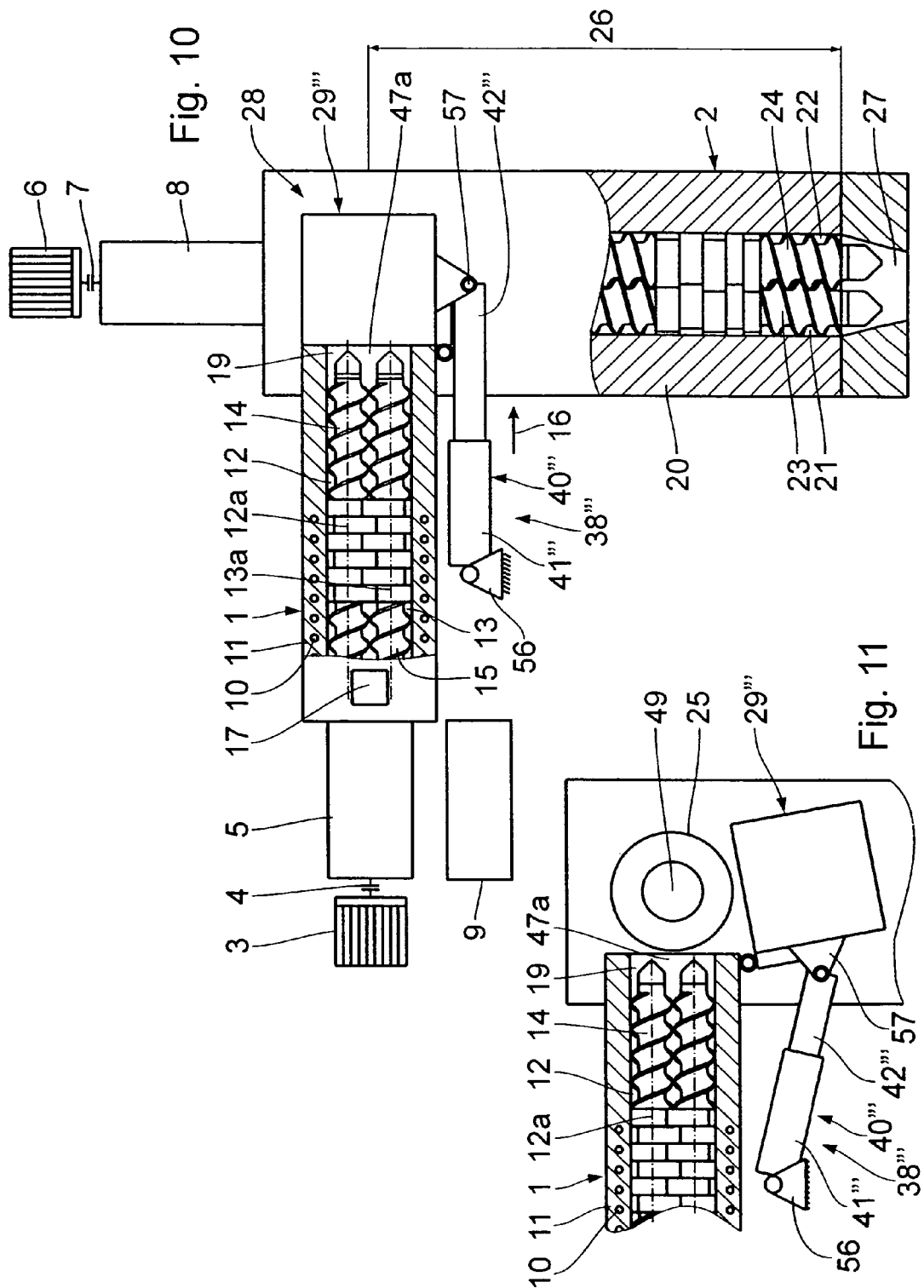

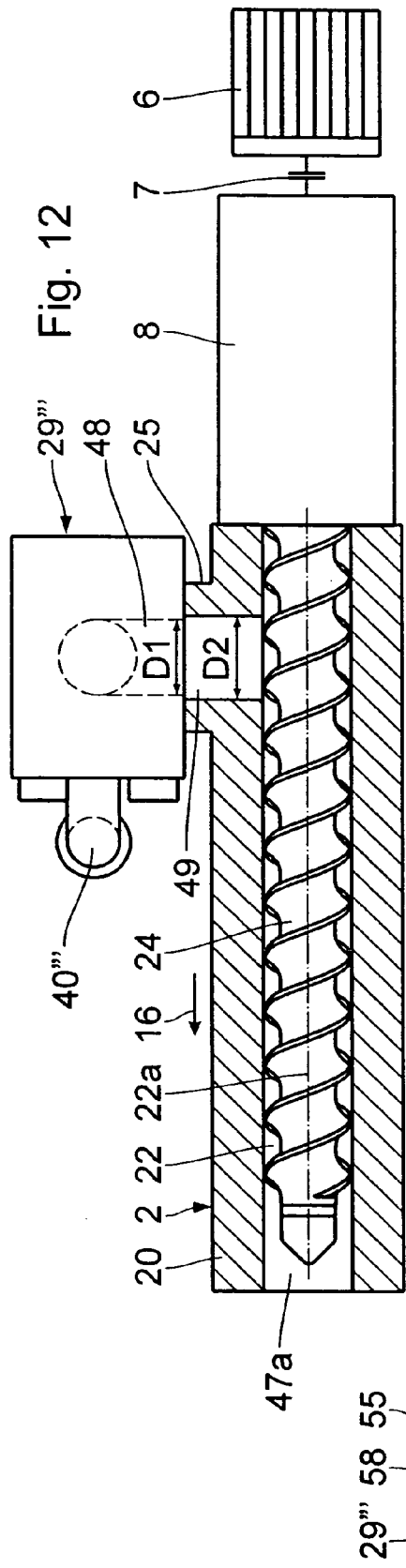
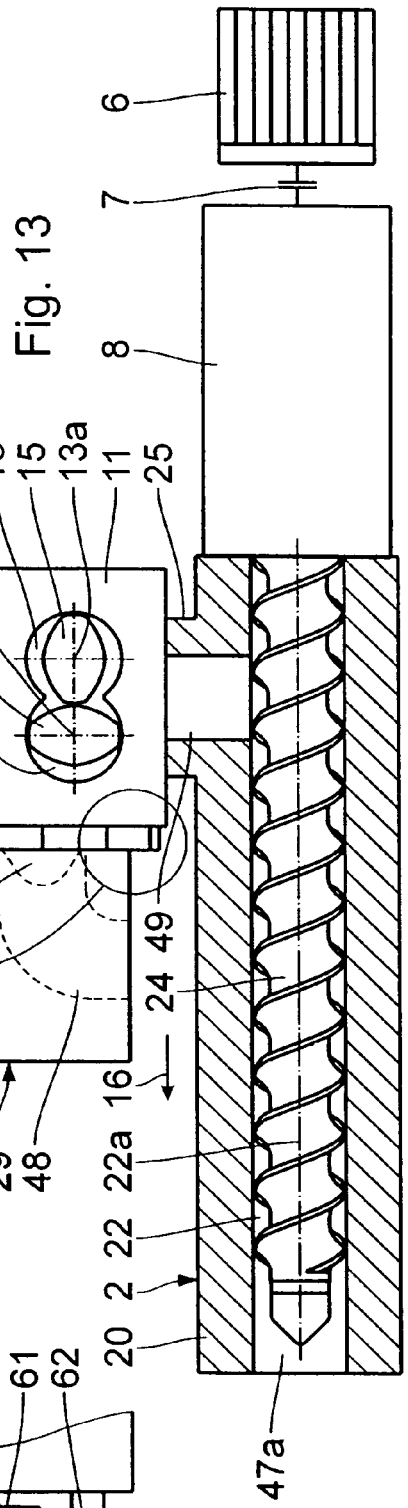

ial processing plant with two extruding machines

FIELD OF THE INVENTION

The invention relates to a material processing plant comprising a first screw-type extruding machine, which has a first casing with at least one first casing bore with an axis and a first screw shaft disposed therein, a second screw-type extruding machine, which has a second casing and which is disposed downstream of the first screw-type extruding machine and which has at least one second casing bore and a second screw shaft disposed therein, and a link, which connects the first screw-type extruding machine and the second screw-type extruding machine in a position of connection and which comprises an elbowed overflow passage, which connects the at least one first casing bore with the at least one second casing bore.

BACKGROUND OF THE INVENTION

In particular in the processing of plastics, it is often reasonable to provide two or several successive extruders, each of which performing individual processing steps. For example, when plastic material is used in the form of powder, inlet and melting of the powder can take place in a first extruder. Homogenizing and pressure build-up then takes place in a second, down-stream extruder. Successive extruder arrangements of the generic type are known for example from EP 1 005 411 B1, U.S. Pat. No. 3,261,056 and DE 2 304 088 A. In the plants of the generic type known from literature and practice, the connecting parts, which often have a weight of several tons, are hard to remove and re-insert, with removal of the connecting parts being indispensable for the screw shafts of the first extruder to be pulled out.

In practice, pulling out the screw shaft through the discharge zone is customary, because the other end is provided with the motor, coupling and transmission and pulling out the screw shaft there poses serious problems. The term 'materials' is to be understood as fundamentally free flowing materials that are treatable in screw-type extruding machines.

SUMMARY OF THE INVENTION

It is an object of the invention to develop a plant of the generic type in such a way that pulling the screw shaft or shafts of the first screw-type extruding machine is especially easy and time-saving.

According to the invention, this object is attained by the link being movable in guided motion from the position of connection into an open position of release of the at least one first casing bore such that the at least one first screw shaft is freely drawable out of the first casing. The object is further attained by a mover, which acts on the link, being provided and performing the guided motion. The gist of the invention resides in that the link has been developed into an independent function group which, by means of a mover, can be transferred from its position of connection, in which the two screw-type extruding machines are interconnected, into an open position, in which the at least one screw bore lies bare so that the screw shaft or shafts of the first extruder can be pulled out customarily in the vicinity of the discharge zone.

Further features, advantages and details of the invention will become apparent from the ensuing description of several embodiments, taken in conjunction with the drawing.

BRIEF DESCRIPTION OF THE DRAWING

FIG. 6 is a vertical sectional view of a second embodiment of a plant according to the invention, with the link in a position of connection;

FIG. 7 is a partial view of a third embodiment, comprising a modified mover;

FIG. 10 is a plan view, partially broken open, of the plant according to the fifth embodiment, with the link in a position of connection;

FIG. 11 is a partial plan view of the plant according to the fifth embodiment, with the link in an open position;

FIG. 12 is a sectional view of the fifth embodiment plotted vertically through the second extruder, with the link in a position of connection;

FIG. 13 is an illustration according to FIG. 12, with the link in an open position; and FIG. 14 is a view of a detail XIV of FIG. 13.

DESCRIPTION OF THE PREFERRED EMBODIMENTS

Figures 1, 3, 4:
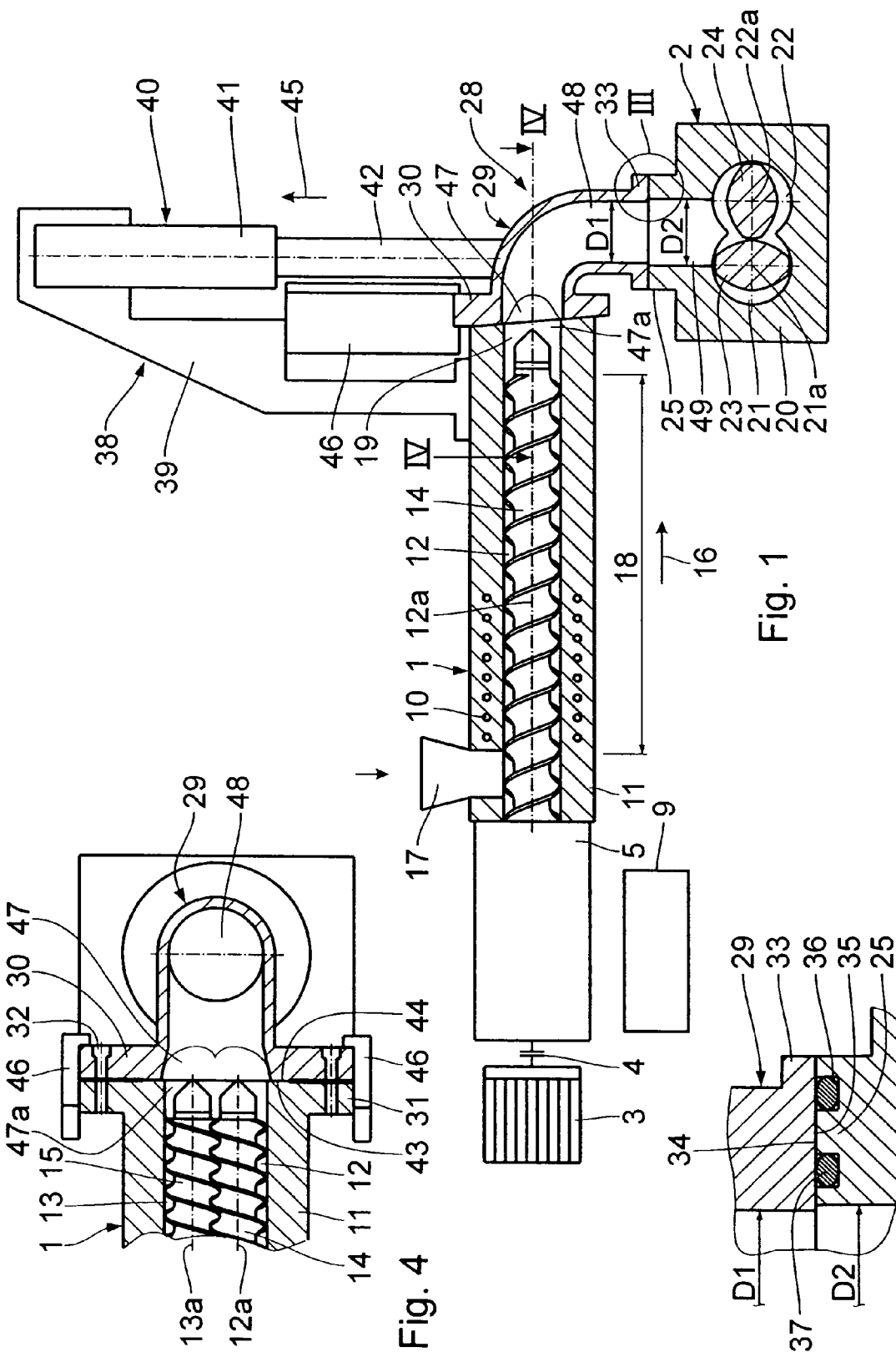
FIG. 1 is a vertical sectional view of a first embodiment of a plant according to the invention, with the link in a position of connection.
FIG. 3 is an illustration of a detail III of FIG. 1.
FIG. 4 is a horizontal partial view seen on the line IV-IV of FIG. 1.
Figure 2:
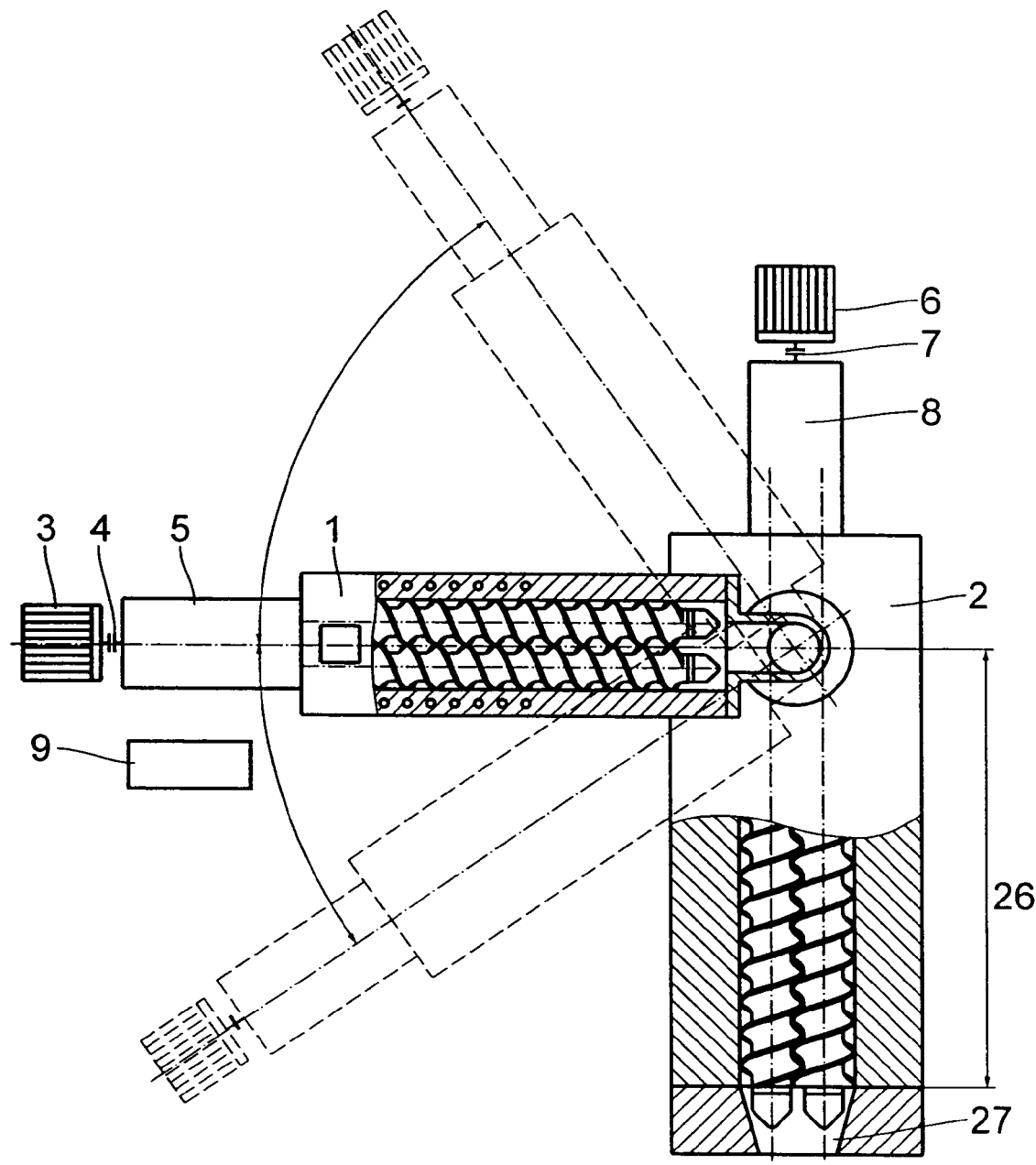
FIG. 2 is a plan view, partially broken open, of the plant according the first embodiment.

The first embodiment seen in FIGS. 1 to 5 comprises a first extruder 1 and a second extruder 2. The first extruder 1 is disposed above the second extruder 2. The first extruder 1 is actuated by a first motor 3 via a first coupling 4 and a first transmission 5. The second extruder 2 is driven by a second motor 6 via a second coupling 7 and a second transmission 8. Control of the motors 3 and 6 takes place by way of a control unit 9.

The first extruder 1 comprises a casing 11 which is provided with a heating system 10 and has two first casing bores 12, 13 with axes 12a, 13a that are parallel to one another, the casing bores 12, 13 being disposed parallel to each other in approximately figure-eight-type interengagement. Two first screw shafts 14, 15 are disposed in these casing bores 12, 13; they are coupled with the first transmission 5. The screw shafts 14, 15 are driven in the same or opposite directions. The first extruder 1 comprises a feed hopper 17 which is disposed downstream of the first transmission 5 as seen in a feed direction 16 and which is followed by a single or several processing zones 18.

A discharge zone 19 is provided at the end of the first extruder 1, discharge in a direction of the axes 12a, 13a taking place from the discharge zone 19. Instead of two casing bores and, correspondingly, two screw shafts, it is just as well possible to have only a single bore or three and more bores and a corresponding number of screw shafts.

The second extruder 2 also comprises a casing 20 with a heating system, two casing bores 21, 22 being disposed in the casing 20, having axes 21a, 22a that are parallel to each other, and interengaging i.e., also defining a figure-eight-type cross-sectional shape. Two screw shafts 23, 24 are disposed in the second casing bores 21, 22; they are coupled with the second transmission 8 and drivable to rotate in the same or opposite directions. Subsequently to the second transmission 8, the second extruder 2 comprises a feeder connection piece 25 which is followed by one or several processing zones 26 in the feed direction 16. A discharge zone 27 is again provided at the end of the second extruder 2.

It is true also for the second extruder 2 that only a single or more than two bores and a corresponding number of screw shafts can be provided. Also in the second extruder 2, the screw shafts can be driven in the same or opposite directions.

A delivery zone 28 is provided between the first extruder 1 and the second extruder 2, comprising a link 29 in the form of a pipe elbow. On the side turned towards the first extruder 1, the link 29 has a connecting flange 30 which is fixed to the casing flange 31, turned there-to, of the first casing by means of screws 32. On the side turned towards the second extruder 2, the link 29 also comprises a connecting flange 33, the contact surface 34 of which bearing against a contact surface 35, turned there-to, of the feeder connection piece 25. The contact surface 35 is provided with recesses 36 where packings 37 are located which, in the non-loaded condition, project upwards beyond the contact surface 35. The link 29 is not joined by screwing to the feeder connection piece 25. The contact surfaces 34 and 35 bear tightly against one another due to thermal expansion during operation.

A mover 38 for the link 29 is disposed on the casing 11 of the first extruder 1. It comprises a bracket-style holding device 39 that is mounted on the casing 11. The holding device 39 supports a motion drive mechanism 40 for the link 29. This motion drive mechanism 40 can be a hydraulically operable piston-cylinder drive, the cylinder 41 of which is mounted on the holding device 39, whereas its piston rod 42 is connected to the link 29. In the first embodiment according to FIGS. 1 to 5, the link 29 is lifted vertically upwards crosswise of the direction of the axes 12a, 13a and 21a, 22a, respectively, of the first extruder 1 and of the second extruder 2. Consequently, elevating also takes place transversely to the contact surfaces 34, between the link 29 and the feeder connection piece 25. For the connecting flange 30 to be as easy as possible to lift off casing flange 31, the contact surfaces 43, 44 of the two flanges 30, 31 incline in relation to the vertical lift-off direction 45 so that they are released from one another directly upon start of the elevation process and, when set counter to the lift-off direction 45, they take contact only at the very last moment. For reliable linear guidance of the link 29 in the lift-off direction 45 and in the opposite direction, guide rails 46 can be joined to the holding device 39 or the casing flange 31, encompassing the connecting flange 30 and guiding it at least in the area where the link 29 is at least sectionally in congruence with the casing flange 31.

Figure 5:
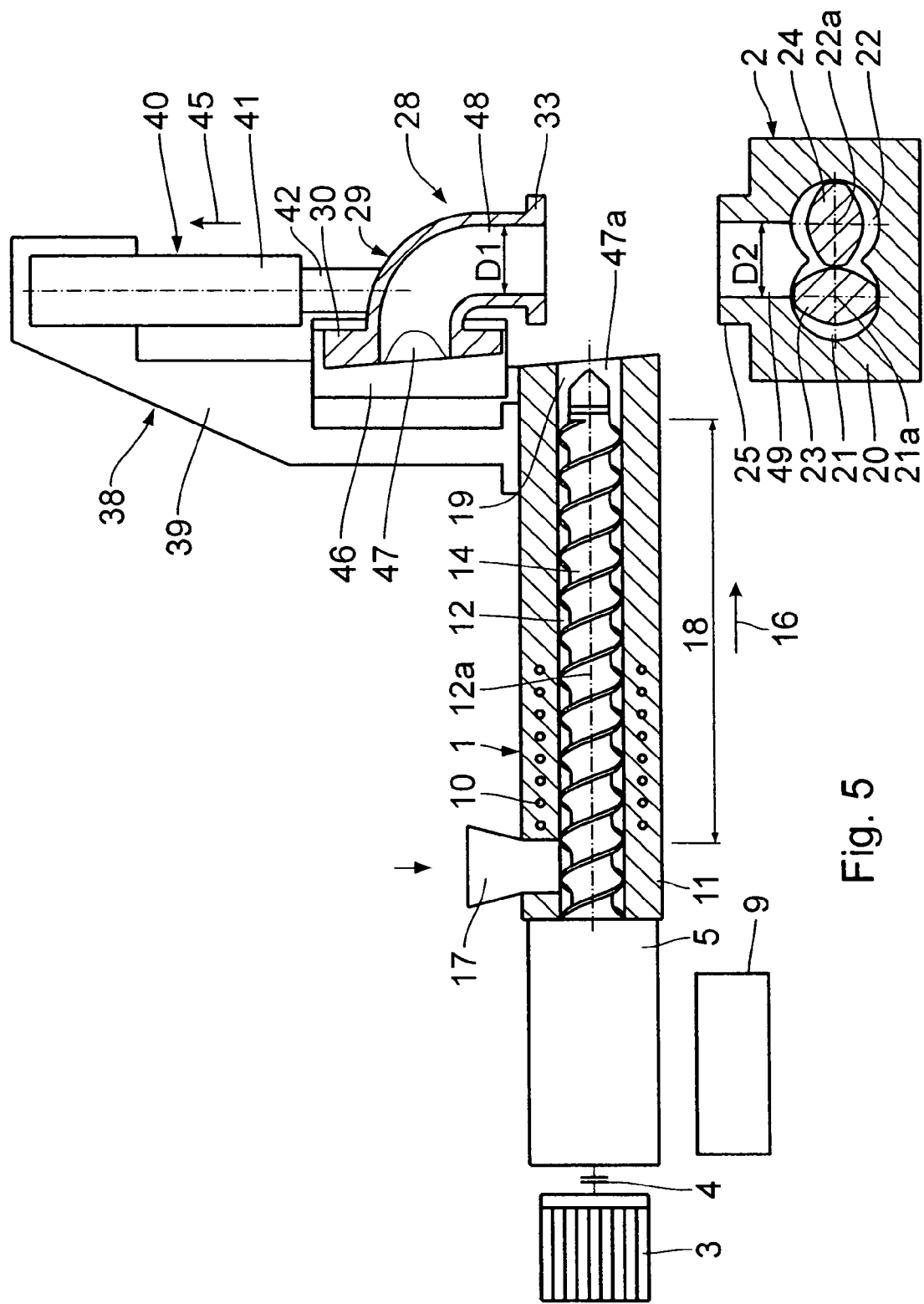
FIG. 5 is a vertical sectional view of the first embodiment of the plant according to the invention, with the link in an open position.

As seen in FIG. 5, the lift-off motion of the link 29 is sufficiently far for the first casing bores 12, 13 to be definitely free in the vicinity of the discharge zone 19 so that the first screw shafts 14, 15, in the direction of their axes 12a, 13a, can be withdrawn freely from the first casing 11.

At the respective places of transition, the overflow passages 47a, 47, 48, 49, which are formed in the discharge zone 19 of the first extruder, the link 29 and the feeder connection piece 25, do not possess any corners or edges that might project into the flow path. The cross-sectional shape of the over-flow passage 47a at the end of the first twin-shaft extruder 2 is figure-eight type. The cross-sectional area of the overflow passage 47a at the end of the extruder 1 is equal to, or less than, the cross-sectional area of the overflow passage 47 in the link 29. A transition of this figure-eight type cross-sectional shape of the overflow passage 47 to the circular cross-sectional shape of the overflow passage 48 in the link 29 of a diameter D1 is integrated in the link 29. Moreover, the diameter D2 of the overflow passage 49 in the feeder connection piece 25 equals or exceeds D1. $D1 \leq D2$ applies. The same applies to cross-sections of extruders that have more than two screw shafts.

The second embodiment according to FIG. 6, which is modified only slightly, differs from the first embodiment only in that the link 29' is of block-type design, still having an elbowed overflow passage 48 without its external shape being tubular.

By alternative of the specified motion drive mechanism 40, a motion drive mechanism 40' in the form of a spindle drive can be used in the mover 38' according to claim 7, having a spindle 50 that acts on the link 29', the spindle 50 being guided in a spindle nut 51 that is rotarily disposed in the holding device 39'. The spindle nut 51 is driven by a spindle-drive motor 52.

The mover 38 or 38', respectively, needs not necessarily act in a vertical lift-off direction 45; it can just as well act horizontally in the direction of the axes 21a, 22a of the second extruder 2 or spatially askew of the direction of the axes 12a, 13a of the first extruder 1. However, the lift-off direction is preferred to work vertically, crosswise of the direction of the axes 12a, 13a of the first extruder.

Figure 8:
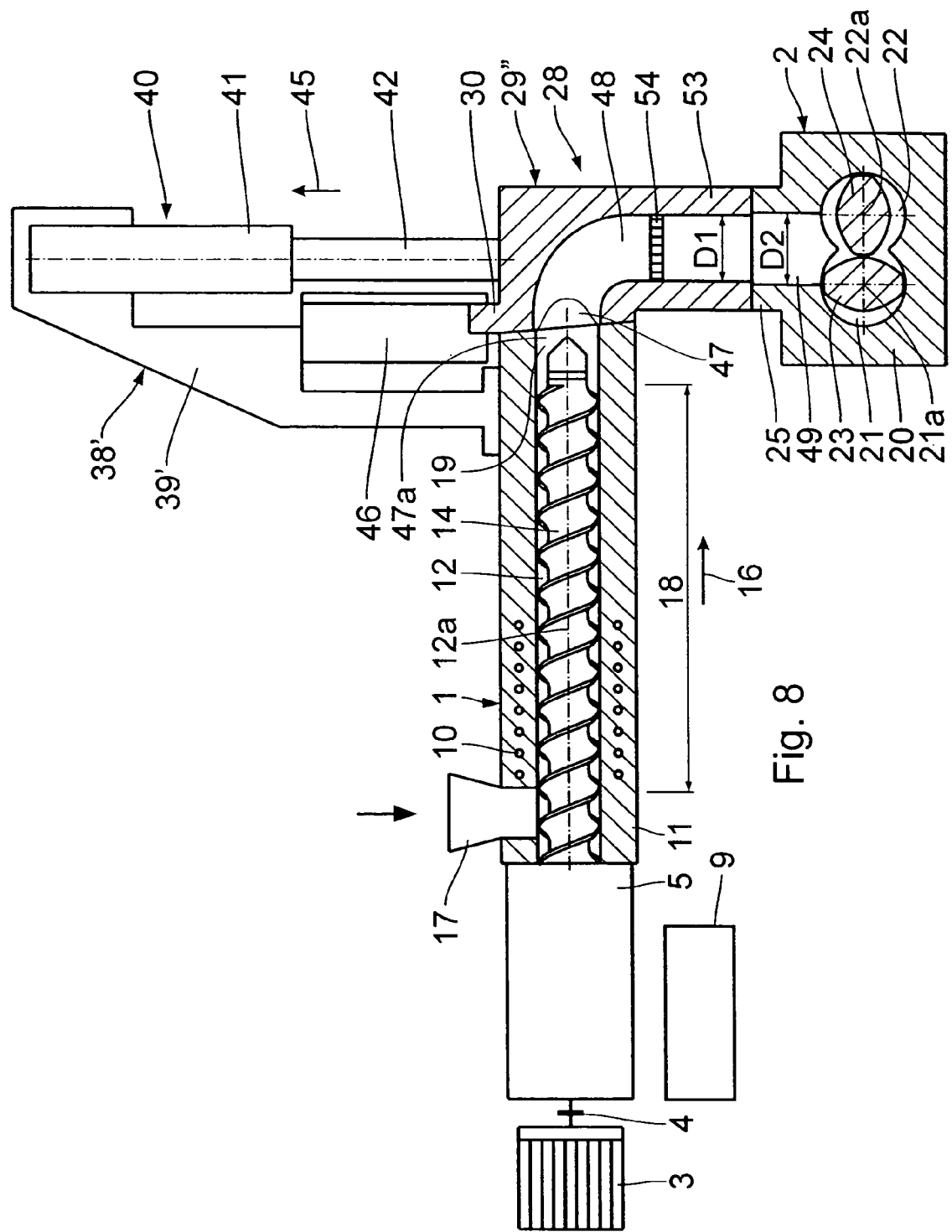
FIG. 8 is a vertical sectional view of a fourth embodiment of a plant according to the invention, with the link in a position of connection, the link having an additional function portion.
Figure 9:
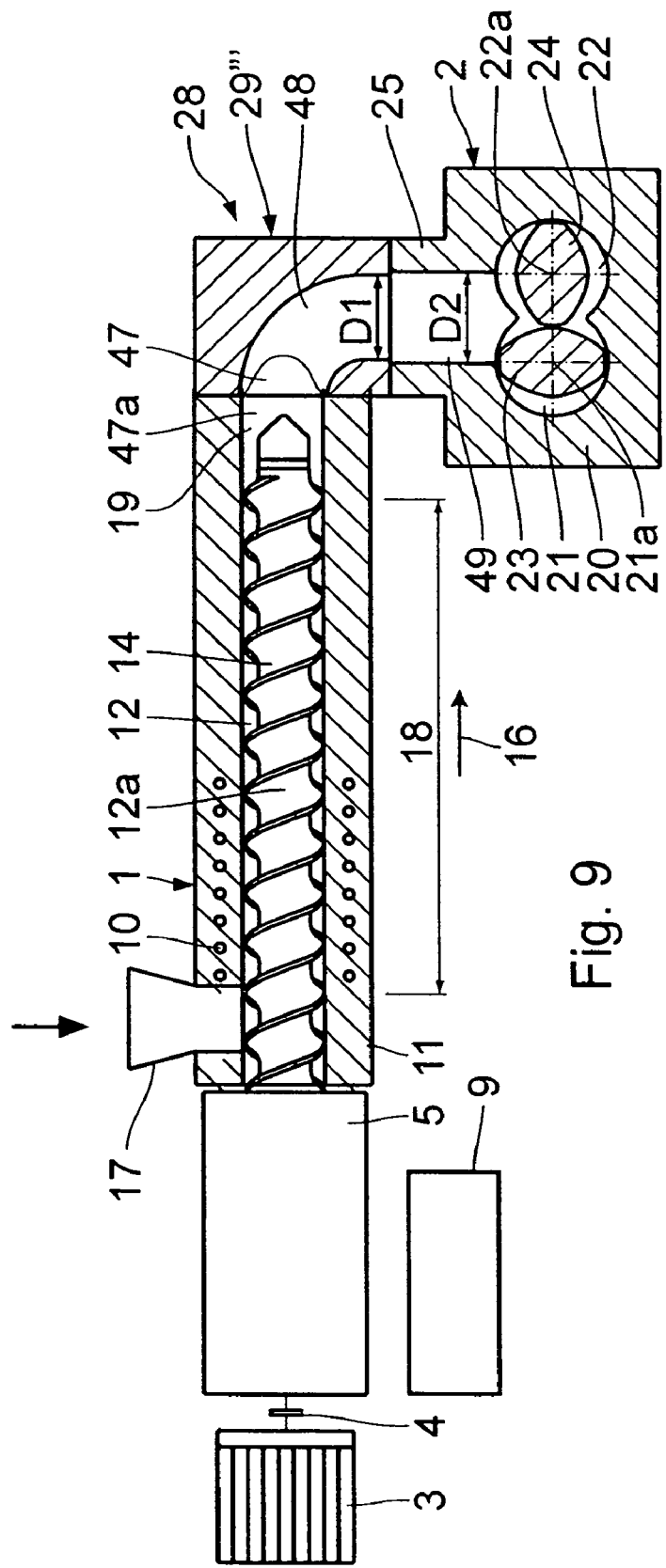
FIG. 9 is a vertical sectional view of a fifth embodiment of a plant according to the invention, with the link in a position of connection.

The modified fourth embodiment according to FIG. 8 differs from the above embodiments in that the link 29'', which is again of block-type design, is prolonged downwards towards the second extruder 2 by a function portion 53 where parts built in 54, such as a strainer plate, a sieve, filter, static mixer or the like, are incorporated or can be incorporated. With these built-in function parts having to be accessible too, two functions, namely withdrawal of screws and exchange and/or maintenance of built-in parts 54, are advantageously combined by only a singly mover device in this fourth embodiment.

The fifth embodiment according to FIGS. 9 to 14 again differs from the above embodiments by the design of the link 29'''. Same as the link 29', it is again of block-style configuration. The link 29''' is mounted on the casing 11 of the first extruder 1 by means of a pivoted connection mechanism 55 so that it can be pivoted from the sealed position of connection seen in FIG. 12 into an open position seen in FIG. 13, as a result opening the first casing bores 12, 13 so that the first screw shafts 14, 15 can be extracted freely and without being impeded in the direction of the axes 12a, 13a.

A mover 38''' comprises a motion drive mechanism 40''' which may again be a hydraulically operable piston-cylinder drive, with the cylinder 41''' being secured stationarily by means of a pivot bearing 56, whereas the piston rod 42''' is joined to the link 29''' by means of a pivot joint 57. For the link 29''', upon pivoting motion, to be lifted not only off the casing 11 of the first extruder, but also off the feeder connection piece 25, the pivoted connection mechanism 55 is a pivoted elevation-connection mechanism. To this end, it comprises a pivot 58 with a steeply pitched multiple thread 59. The bearing sleeve 60 has a corresponding internal thread 61 so that the link 29''' is displaced i.e., elevated in the present case, right at the beginning of the opening motion in the direction of the pivoting axis 62 of the pivoted connection mechanism 55, with the link 29''' being lifted off the feeder connection piece 25. In the sealed position of connection according to FIGS. 9, 10 and 12, the link 29''' is joined by screwing to the casing 11 of the first extruder 1 or the feeder connection piece 25 of the second extruder 2. The screwing job can be dropped in certain cases, if for example there is only low pressure, or if the materials to be processed are of low viscosity, provided there are no built-in parts. In this case, the link 29''' can be kept in the sealed position of connection by the motion drive mechanism 40'''.

The invention claimed is:

1. A material processing plant, comprising:
   a first screw-type extruding machine, which has a first casing with at least one first casing bore with an axis and a first screw shaft disposed therein;
   a second screw-type extruding machine, which has a second casing with at least one second casing bore, said second screw-type extruding machine being disposed downstream of the first screw-type extruding machine; and
   a link, which connects the first screw-type extruding machine and the second screw-type extruding machine in a position of connection and which comprises an elbowed overflow passage, said overflow passage connecting said at least one first casing bore with said at least one second casing bore, wherein the link is movable in guided motion from the position of connection into an open position of release of the at least one first casing bore such that at least one said first screw shaft is freely drawable in a direction out of said first casing, wherein a mover, which acts on the link, is provided, performing the guided motion.

2. A plant according to claim 1, wherein the mover comprises a holding device and a motion drive mechanism.

3. A plant according to claim 2, wherein the holding device is mounted on one of the screw-type extruding machines.

4. A plant according to claim 1, wherein the link is linearly displaceably in relation to the first screw-type extruding machine.

5. A plant according to claim 1, wherein the link is guided for displacement in relation to the first screw-type extruding machine by means of guide rails.

6. A plant according to claim 1, wherein the link is displaceable crosswise of the longitudinal direction of the first screw-type extruding machine.

7. A plant according to claim 1, wherein the link is pivotable from the position of connection into the open position.

8. A plant according to claim 7, wherein the link is articulated to one of the screw-type extruding machines by means of a pivoted connection mechanism.

9. A plant according to claim 8, wherein the pivoted connection mechanism is a pivoted elevation-connection mechanism.

10. A plant according to claim 9, wherein the pivoted connection mechanism comprises a pivot with a steeply pitched thread and a bearing sleeve which is disposed thereon and has an internal thread.

11. A plant according to claim 1, wherein the link comprises an additional function portion with built-in parts.

12. A plant according to claim 1, wherein only one contact surface between the link and one of the screw-type extruding machines is provided with packings.

13. A plant according to claim 1, wherein, being a second overflow passage of a diameter, the overflow passage which is formed in the link is connected to the first screw-type extruding machine by way of a first overflow passage and to the second screw-type extruding machine by way of a third overflow passage of a diameter; and
   wherein $D1 \leqq D2$ applies to the relationship of D1 to D2.

14. A plant according to claim 1, wherein the first screw-type extruding machine comprises two said first casing bores which intersect in figure-eight-type cross-sectional shape;
   wherein, being a second overflow passage of circular cross-sectional shape and diameter, the overflow passage which is formed in the link is connected to the first screw-type extruding machine by a first overflow passage; and
   wherein the first overflow passage comprises a transition from a figure-eight-type cross-sectional shape to a circular cross-sectional shape.

15. A plant according to claim 14, wherein the first overflow passage is formed in the link.

16. A plant according to claim 1, wherein the mover is joined to the plant.

17. A material processing plant, comprising:
   a first screw-type extruding machine, which has at least one casing bore and a screw shaft disposed therein;
   a second screw-type extruding machine, which is disposed downstream of the first screw-type extruding machine; and
   a link, which connects the first screw-type extruding machine and the second screw-type extruding machine in a position of connection and which comprises an overflow passage, wherein the link is movable in guided motion from the position of connection into an open position of release of the at least one casing bore, wherein a mover, which acts on the link, is provided, performing the guided motion, said link being pivotable from the position of connection into the open position.

18. A plant according to claim 17, wherein the link is articulated to one of the screw-type extruding machines by means of a pivoted connection mechanism.

19. A plant according to claim 18, wherein the pivoted connection mechanism is a pivoted elevation-connection mechanism.

20. A plant according to claim 19, wherein the pivoted connection mechanism comprises a pivot with a steeply pitched thread and a bearing sleeve which is disposed thereon and has an internal thread.

21. A plant according to claim 17, wherein the link comprises an additional function portion with built-in parts.

22. A plant according to claim 17, wherein only one contact surface between the link and one of the screw-type extruding machines is provided with packings.

23. A plant according to claim 17, wherein, being a second overflow passage of a diameter, the overflow passage which is formed in the link is connected to the first screw-type extruding machine by way of a first overflow passage and to the second screw-type extruding machine by way of a third overflow passage of a diameter; and
   wherein $D1 \leqq D2$ applies to the relationship of D1 to D2.

24. A plant according to claim 17, wherein the first screw-type extruding machine comprises two casing bores which intersect in figure-eight-type cross-sectional shape;
   wherein, being a second overflow passage of circular cross-sectional shape and diameter, the overflow passage which is formed in the link is connected to the first screw-type extruding machine by a first overflow passage; and
   wherein the first overflow passage comprises a transition from a figure-eight-type cross-sectional shape to a circular cross-sectional shape.

25. A plant according to claim 24, wherein the first overflow passage is formed in the link.

26. A plant according to claim 17, wherein the mover is joined to the plant.

* * * * *